United States Patent [19]

Suzuki

[11] Patent Number: 4,560,711

[45] Date of Patent: Dec. 24, 1985

[54] TRANSPARENT ORGANOPOLYSILOXANE COMPOSITIONS

[75] Inventor: Toshio Suzuki, Ichihara, Japan

[73] Assignee: Toray Silicone Company, Ltd., Tokyo, Japan

[21] Appl. No.: 692,607

[22] Filed: Jan. 17, 1985

[30] Foreign Application Priority Data

Jan. 20, 1984 [JP] Japan .................................. 59-8686

[51] Int. Cl.$^4$ .............................................. C08K 3/36
[52] U.S. Cl. .................................... 523/212; 523/213; 524/588
[58] Field of Search ................. 523/212, 213; 524/588

[56] References Cited

U.S. PATENT DOCUMENTS 3,624,023 11/1971 Hartlege ............................... 523/213
3,996,189 12/1976 Travnicek ............................ 524/588
4,310,444 1/1982 Hamada et al. ...................... 524/588

FOREIGN PATENT DOCUMENTS 52-77154 6/1977 Japan .................................. 523/212

*Primary Examiner*—Lewis T. Jacobs
*Attorney, Agent, or Firm*—Roger H. Borrousch

[57] ABSTRACT

A noncuring transparent organopolysiloxane composition obtained from a mixture of phenyl containing organopolysiloxane with at least 50% methyl radicals and 5 to 20% phenyl radicals and a finely divided silica treated with a phenyl containing silane or polysiloxane and a hydroxyl or hydrolyzable group is used in optical communications components, such as filler or a coupling agent.

6 Claims, No Drawings

TRANSPARENT ORGANOPOLYSILOXANE COMPOSITIONS

BACKGROUND OF THE INVENTION

1. Field of the Invention

This invention relates to noncuring transparent organopolysiloxane compositions useful as coupling agents or fillers for optical communication components.

2. Background Information

Organopolysiloxane compositions of organopolysiloxane and finely particulate silica are generally called silicone compounds and are used for diverse applications such as lubricants, sealants, release compounds, and fillers due to their excellent heat resistance, cold resistance, weather resistance, lubricity, nonflowability, electric insulation, and water repellency. However, in such silicone compounds, the index of refraction of the organopolysiloxane is different from the index of refraction of the fine powder, for example, $n_D^{25} = 1.4040$ for dimethylpolysiloxane while $n_D^{25} = 1.430$ for finely particulate silica (where $n_D^{25}$ is the index of refraction at 25° C. here and below) and they are opaque due to diffuse reflection at the solid's surface. Such silicone compounds exhibit a poor light transmittance of 90% or less at a wavelength of 500 nm.

As a result, organopolysiloxanes containing the phenyl radical have been introduced in order to increase the index of refraction of the organopolysiloxane up to that of the finely particulate silica and thus to improve the transparency of the resulting silicone compound. However, the resulting silicone compounds suffer the restriction that, with a $n_D^{25}$ of approximately 1.43, they cannot be used as binder fillers for optical communication elements with an optical component with a $n_D^{25}$ of 1.45 to 1.48. Liquid organopolysiloxanes with a $n_D^{25}$ of 1.45 to 1.48, known as matching oils, have been used in the prior art as binder fillers for such optical communication elements; however, they present the drawback of flowing out of the filled part due to their fluidity.

Various methods were examined by the present inventor for the purpose of eliminating the above drawbacks and a transparent organopolysiloxane composition with an index of refraction of 1.45 to 1.48 at 25° C. and an insignificant fluidity was discovered as a result.

SUMMARY OF THE INVENTION

This invention relates to a transparent organopolysiloxane composition consisting essentially of (A) 100 parts by weight of organopolysiloxane having an average formula unit formula

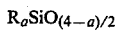

$$R_aSiO_{(4-a)/2}$$

in which each R is a monovalent radical selected from the group consisting of hydrocarbon radicals, halogenated alkyl radicals, mercaptoalkyl radicals, glycidoxyalkyl radicals, methacryloxyalkyl radicals, hydroxyl radicals, alkoxy radicals, and hydrogen atom and in the total number of R in the organopolysiloxane, at least 50% are methyl and from 5 to 20% are phenyl, and a has an average value of 1.8 to 2.2, the organopolysiloxane having an index of refraction of 1.45 to 1.48 at 25° C., and a viscosity of from 0.01 to 50 Pa·s at 25° C., and (B) from 0.5 to 50 parts by weight of a finely particulate silica which has been treated with a silane or polysiloxane which contains at least one hydroxyl radical or hydrolyzable radical and at least one phenyl radical per molecule, the silica having a treatment of from 0.5 to 60 weight percent based on the weight of the silica.

DETAILED DESCRIPTION OF THE INVENTION

The organopolysiloxane (A) is the major ingredient in the transparent composition of this invention. In the average unit formula defining (A), each R represents a monovalent radical bonded to a silicon atom, where at least 50% of the total number of R present in the organopolysiloxane are methyl and from 5 to 20% are phenyl. The remaining R, if monovalent radicals other than methyl and phenyl are present, are selected from hydrocarbon radicals such as alkyl radicals, such as ethyl, propyl, isopropyl, butyl, and isobutyl, alkenyl radicals such as vinyl, allyl, and isopropenyl, and aryl such as tolyl, xylyl, and naphthyl; halogenated alkyl radicals such as trifluoropropyl and trichloroethyl; mercaptoalkyl radicals such as mercaptopropyl; glycidoxyalkyl radicals such as glycidoxypropyl, methacryloxyalkyl radicals such as methacryloxypropyl; hydroxyl radical; alkoxy radicals such as methoxy, ethoxy, and and isopropoxy; and hydrogen atom. Preferably, at least 70% of the R are methyl and 7 to 20% are phenyl.

When methyl is 50 mol % or less in (A), the heat resistance and weather resistance are both unsatisfactory and it is difficult to adjust the index of refraction. When phenyl does not fall within the 5 to 20% range, it is again difficult to adjust the index of refraction. a is 1.8 to 2.2 on average and preferably is 1.95 to 2.05. The viscosity of (A) is 0.01 to 50 Pa·s at 25° C. from the standpoint of the workability in mixing with (B). The index of refraction of (A) as measured by the D line at a wavelength of 5890 angstroms must be 1.45 to 1.48 at 25° C. When this index of refraction does not fall within the range of 1.45 to 1.48, it will be different from the index of refraction of an optical glass. For this reason, the organopolysiloxane composition will exhibit refraction at the interface and thus cannot have the desired property.

Examples of the above organopolysiloxanes are: trimethylsilyl-terminated dimethylsiloxane-diphenylsiloxane copolysiloxanes, trimethylsilyl-terminated dimethylsiloxane-methylphenylsiloxane copolysiloxanes, hydroxydimethylsilyl-terminated dimethylsiloxane-diphenylsiloxane copolysiloxanes, trimethylsilyl-terminated dimethylsiloxanediphenylsiloxane-phenylethylsiloxane copolysiloxanes, and copolysiloxanes constituted of at least 3 units selected from among $(CH_3)_2SiO$ units, $(CH_3)_3SiO_{\frac{1}{2}}$ units, $(CH_3)_2SiO_{3/2}$ units, $CH_3(C_6H_5)SiO$ units, and $C_6H_5SiO_{3/2}$ units.

Ingredient (B), a finely particulate silica which has been treated with a hydroxyl group-containing or a hydrolyzable group-containing phenylsilane or phenylpolysiloxane, is mixed with (A) in order to prevent flow while not adversely affecting the transparency. The silane or polysiloxane used to treat the finely particulate silica must possess at least one silicon-bonded hydroxyl radical or silicon-bonded hydrolyzable radical and at least one phenyl per molecule. Preferably, 0.1 to 2.5 silicon-bonded hydroxyl or hydrolyzable radicals are present on average per silicon atom and 0.2 to 3.0 phenyl are present on average per silicon atom. These conditions derive from the following. When this molecule does not possess at least one silicon-bonded hydroxyl radical or hydrolyzable radical, it cannot be used to treat the surface of the finely particulate silica. When the above molecule does not contain at least one phenyl, it cannot maintain the transparency of the composition of the present invention. The molecular weight of the polysiloxane 4,000 or less and more preferably 2,500 or less. When the molecular weight exceeds 4,000, the polysiloxane will have an unsatisfactory workability in silica treatment and its reactivity with hydroxyl on the surface of the silica is reduced. Examples of organic groups, other than the hydroxyl radical, hydrolyzable radical, and phenyl, which are bonded in the above silane or polysiloxane are the same as cited above for the R in (A).

Examples of the preceding silanes and polysiloxanes in which Ph=the phenyl radical are the following:

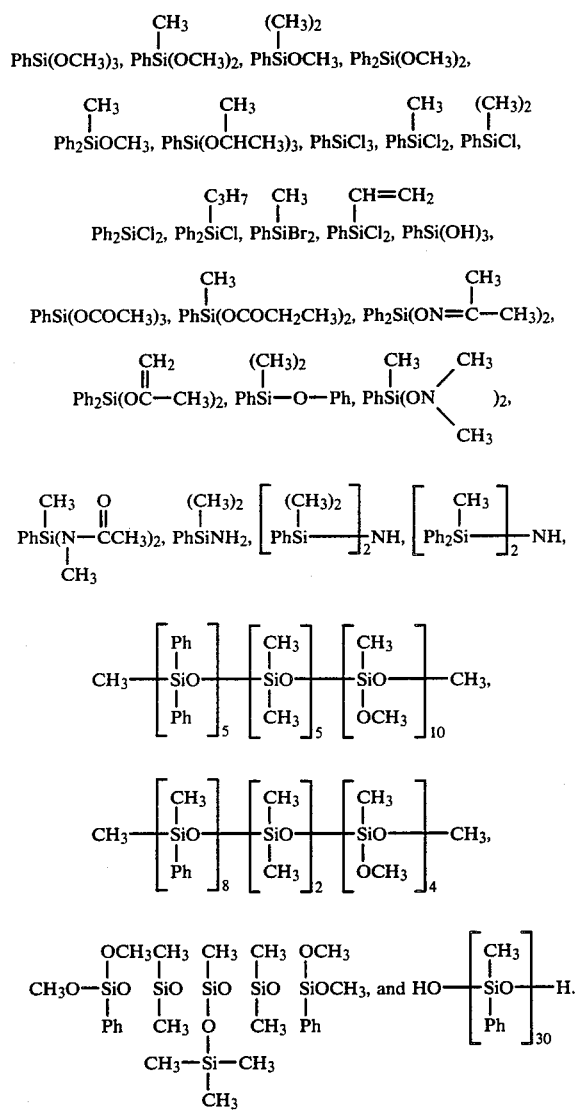

Examples of the finely particulate silica of (B) are fumed silica, calcined silica, precipitated silica, and fine natural silica powder. The primary particle size of the silica is arbitrary; however, it is preferably 100 millimicrons or less from the standpoint of retaining the transparency of the composition of the present invention.

Ingredient (B) is produced by treating the finely particulate silica with the hydroxyl radical-containing or hydrolyzable radical-containing phenylsilane or phenylsiloxane described above. This treatment method is arbitrary. For example, the finely particulate silica may be treated by standing at room temperature or heating in (A) or in an organic solvent, under the atmosphere or under an inert gas. In such cases, by-products produced during the treatment from the hydrolyzable radicals are desirably removed at elevated temperatures and reduced pressure. The quantity of above silane or polysiloxane used in the treatment of the finely particulate silica. The quantity of addition of the finely particulate silica of (B) is 0.5 to 50 parts by weight and preferably 5 to 30 parts by weight per 100 parts by weight (A). When this quantity is less than 0.5 part by weight, the fluidity of the composition will be too high. When this quantity exceeds 50 parts by weight, the viscosity of the composition will be high and mixing to homogeneity will be difficult.

The organopolysiloxane composition of the present invention is produced by mixing (A) and (B) at room or elevated temperature. The mixing method is arbitrary and, for example, the preceding two ingredients can be mixed using a mixer such as a three-roll mixer, bar setter, or colloid mill.

Thermal stabilizers, dispersion assistants, flame retardants, anti-flow agents, and antioxidants can be added to the composition of the present invention as long as they do not adversely affect the transparency of the composition.

The organopolysiloxane composition of the present invention exhibits an excellent transparency, index of refraction, and nonfluidity and can be used as an optical matching agent, coupling agent, or filler and in particular is appropriately used as a matching agent for the cores of optical glass communication fibers with each other or with the cores of other optical components.

The present invention will be explained using demonstrational examples. "Parts" in the examples denotes "parts by weight" and the viscosity was measured at 25° C. The light transmittance was measured on a 5 mm thick sample at a wavelength of 500 nm and the slump was measured by the method of JIS A5758.

EXAMPLE 1

100 parts of a fumed silica with an average primary particle size of 13 millimicrons and a specific surface of 200 m²/g, 20 parts methylphenyldimethoxysilane, and 1 part ammonium carbonate as the catalyst were placed in a tumbler mixer, mixed at room temperature for 12 hours and then allowed to stand at an elevated temperature of 120° C. for 3 hours in order to remove both the unreacted silane and the by-products. A silica was thus obtained which had been treated with a phenyl-substituted organosilicon compound.

16 parts of the above treated silica were mixed with 100 parts of a trimethylsilyl-terminated dimethylsiloxane-methylphenylsiloxane copolysiloxane (dimethylsiloxane:methylphenylsiloxane molar ratio of 64:36, 1.0 Pa·s viscosity, $n_D^{25}=1.475$) in a planetary mixer for 1 hour and then further kneaded to homogeneity using a three-roll mill.

The resulting organopolysiloxane composition had a transparency corresponding to a 95% light transmittance, $n_D^{25}=1.474$, and a slump of 1 mm indicating almost no fluidity.

For comparison, a composition was produced by the same method as above with the exceptions that hexamethyldisilazane was used instead of the above phenyl-substituted silane and water was used instead of ammonium carbonate. The resulting composition had an opacity corresponding to a 45% light transmittance and a fluidity corresponding to a slump of ≧50 mm.

EXAMPLE 2

10 parts of a fumed silica with an average primary particle size of 7 millimicrons and a specific surface of 300 m²/g and 150 parts 1,1,1-trichloroethane as organic solvent were placed in a flask and then thoroughly stirred. The resulting mixture was combined with 3 parts of the partial cohydrolysis condensation product of phenyltrimethoxysilane and dimethyldimethoxysilane (1:2.2 molar ratio, 18 wt % methoxy radicals) and then combined with 0.1 parts ammonium carbonate and then reacted at 40° C. for 4 hours. The resulting suspension containing the treated silica was combined with 70 parts of a trimethylsilyl-terminated dimethylsiloxane-diphenylsiloxane copolysiloxane (dimethylsiloxane:-phenylsiloxane molar ration of 85:15, 2.0 Pa·s viscosity, $n_D{}^{25}=1.465$) followed by mixing for 1 hour and then distilling under reduced pressure to remove the solvent, unreacted material, and by-products. The organopolysiloxane composition thus produced had a transparency corresponding to a 99% light transmittance, $n_D{}^{25}=1.645$, and was not fluid with a slump of 0 mm.

For comparison, a composition was produced by the same method as above with the exception that dimethyldimethoxysilane was used in place of the above partial cohydrolysis condensation product. This composition was opaque with a light transmittance of 55% and was fluid with a slump of ≧50 mm.

EXAMPLE 3

100 parts of a trimethylsilyl-terminated dimethylsiloxane-methylphenylsiloxane copolysiloxane (dimethylsiloxane:methylphenylsiloxane molar ratio of 68:32, 1.5 Pa·s viscosity, $n_D{}^{25}=1.469$), 5 parts methylphenyldiethoxysilane and 0.2 parts ammonium carbonate were placed in a planetary mixer and mixed at room temperature for 10 minutes. This mixture was then combined with 16 parts of the fumed silica used in Example 1 followed by mixing at room temperature for 6 hours. The unreacted materials and by-products were then removed by heating at 150° C. under reduced pressure. The resulting mixture was cooled to room temperature and then kneaded using a three-roll mill to obtain an organopolysiloxane composition with a transparency corresponding to a 93% light transmittance, $n_D{}^{25}=1.469$, and an absence of fluidity corresponding to a slump of 0 mm.

For comparison, a composition was produced by the same method as above with the exception that dimethyldiethoxysilane was used instead of methylphenyldiethoxysilane. The resulting composition was opaque with a 48% light transmittance.

EXAMPLE 4

100 parts of a fumed silica with an average primary particle size of 7 millimicrons and a specific surface of 300 m²/g and 5 parts methylphenyldichlorosilane were placed in a tumbler mixer and mixed at room temperature for 5 hours. The resulting mixture was heated to 200° C. to remove the unreacted silane and by-products and obtain a treated silica. 100 parts of the organopolysiloxane copolymer of Example 1 and 15 parts of the preceding treated silica were placed in a planetary mixer, mixed at room temperature for 1 hour and then further kneaded in a three-roll mill to obtain an organopolysiloxane composition which was transparent with a 97% light transmittance, $n_D{}^{25}=1.475$, and was almost not fluid with a slump of 3 mm.

For comparison, a composition was produced by the same method as above with the exception that dimethyldichlorosilane was used instead of the above silane. The resulting composition was opaque with a light transmittance of 33% and was fluid with a slump ≧50 mm.

EXAMPLE 5

100 parts of a dimethylvinylsilyl-terminated dimethylsiloxane-methylphenylsiloxane copolysiloxane (dimethylsiloxane:methylphenylsiloxane molar ratio of 76:24, 2.0 Pa·s viscosity, $n_D{}^{25}=1.455$), 4 parts tetramethyldiphenyldisilazane, and 0.1 part water were placed in a planetary mixer and mixed for 10 minutes. The resulting mixture was combined with 14 parts of a fumed silica with an average primary particle size of 10 millimicrons and a specific surface of 250 m²/g and this was mixed for 3 hours and then heated at 150° C. under reduced pressure in order to remove the unreacted materials and by-products. The mixture was cooled and then kneaded in a three-roll mill to obtain an organopolysiloxane composition which was transparent with a 92% light transmittance and which exhibited almost no fluidity with a slump of 3 mm.

For comparison, a composition was produced by the same method as above with the exception that hexamethyldisilazane was used instead of the above silazane. The resulting composition was opaque with a light 65% light transmittance and was fluid with a slump of ≧50 mm.

That which is claimed is:

1. A transparent organopolysiloxane composition consisting essentially of
(A) 100 parts by weight of organopolysiloxane having an average formula unit formula $$R_aSiO_{(4-a)/2}$$

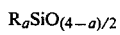

in which each R is a monovalent radical selected from the group consisting of hydrocarbon radicals, halogenated alkyl radicals, mercaptoalkyl radicals, glycidoxyalkyl radicals, methacryloxyalkyl radicals, hydroxyl radicals, alkoxy radicals, and hydrogen atom and in the total number of R in the organopolysiloxane, at least 50% are methyl and from 5 to 20% are phenyl, and a has an average value of 1.8 to 2.2, the organopolysiloxane having an index of refraction of 1.45 to 1.48 at 25° C., and a viscosity of from 0.01 to 50 Pa·s at 25° C., and
(B) from 0.5 to 50 parts by weight of a finely particulate silica which has been treated with a silane or polysiloxane which contains at least one hydroxyl radical or hydrolyzable radical and at least one phenyl radical per molecule, the silica having a treatment of from 0.5 to 60 weight percent based on the weight of the silica.

2. A transparent organopolysiloxane composition consisting of
(A) 100 parts by weight of organopolysiloxane having an average formula unit formula $$R_aSiO_{(4-a)/2}$$

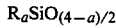

in which each R is a monovalent radical selected from the group consisting of hydrocarbon radicals, halogenated alkyl radicals, mercaptoalkyl radicals, glycidoxyalkyl radicals, methacryloxyalkyl radicals, hydroxyl radicals, alkoxy radicals, and hydrogen atom and in the total number of R in the organopolysiloxane, at least 50% are methyl and from 5 to 20% are phenyl, and a has an average value of 1.8 to 2.2, the organopolysiloxane having an index of refraction of 1.45 to 1.48 at 25° C., and a viscosity of from 0.01 to 50 Pa·s at 25° C., and (B) from 0.5 to 50 parts by weight of a finely particulate silica which has been treated with a silane or polysiloxane which contains at least one hydroxyl radical or hydrolyzable radical and at least one phenyl radical per molecule, the silica having a treatment of from 0.5 to 60 weight percent based on the weight of the silica.

3. The composition according to claim 1 in which the organopolysiloxane (A) has at least 70% methyl radicals in the total number of R and from 7 to 20% phenyl radicals in the total number of R, a has a value of 1.95 to 2.05, and the silica (B) is present in an amount of from 5 to 30 parts by weight.

4. The composition according to claim 1 in which the organopolysiloxane (A) is a trimethylsilyl-terminated dimethylsiloxane-methylphenylsiloxane copolysiloxane having 60 to 70 mol % dimethylsiloxane units and 30 to 40 mol % methylphenylsiloxane units and the viscosity at 25° C. is from 0.5 to 5 Pa·s and silica (B) is treated with methylphenyldimethoxysilane, methylphenyldiethoxysilane, or methylphenyldichlorosilane.

5. The composition according to claim 1 in which the organopolysiloxane (A) is a trimethylsilyl-terminated dimethylsiloxane-diphenylsiloxane copolysiloxane having from 80 to 90 mol % diphenylsiloxane units and the viscosity at 25° C. is from 0.5 to 5 Pa·s, and silica (B) is treated with a partial cohydrolysis condensation product of a mixture of phenyltrimethoxysilane and dimethyldimethoxysilane where the molar ratio is 1:2.2 and the condensation product has 18 weight percent methoxy radicals.

6. The composition according to claim 1 in which the organopolysiloxane (A) is a dimethylvinyl-terminated dimethylsiloxane-methylphenylsiloxane copolysiloxane having 70 to 80 mol % dimethylsiloxane units and 20 to 30 mol % methylphenylsiloxane units and the viscosity at 25° C. is from 0.5 to 5 Pa·s, and silica (B) is treated with tetramethyldiphenyldisilazane.

* * * * *